3,404,023
METHOD OF IMPROVING THE STRENGTH CHARACTERISTICS OF GLASS REINFORCED LAMINATES

Malcolm E. Schrader, Brooklyn, and Irving Lerner, Woodside, N.Y., assignors to the United States of America as represented by the Secretary of the Navy
No Drawing. Filed May 28, 1965, Ser. No. 459,954
5 Claims. (Cl. 117—69)

ABSTRACT OF THE DISCLOSURE

Coupling agents for glass fiber surfaces and application techniques for preceding bonding of the glass to resin as in glass reinforced plastic laminates, including applying to the glass surface an aqueous solution of diethyl phosphite, then drying and setting the applied solution where the glass surface may preliminarily have had applied thereto an aqueous solution of gamma-aminopropyl triethoxysilane that was dried and set.

---

The invention describerd herein may be manufactured and used by or for the Government of the United States of America for governmental purposes without the payment of any royalties thereon or therefor.

The present invention is related to our copending application for Organophosphorus Coupling Agents for Glass Laminates, Ser. No. 444,085, and filed Mar. 30, 1965. The invention disclosed in the copending application resides in the discovery that the aminoalkyl or aminoaryl phosphonates of the organophosphorus ester group react with the surfaces of glass fibers to provide surface finishes which function as coupling agents for greatly improving the strength of epoxy resin glass reinforced laminates.

One of the main uses for glass fiber has been in the production of glass reinforced plastics but the surfaces of glass fibers are not suitable for the formation of a strong bond between organic resinous materials and glass fibers. Also, any bonding which can be developed with an unfinished glass surface will be adversely affected by the formation of a water film on the glass surface upon exposure to high humidity or moisture conditions. In order to obtain an effective bonding relationship between the resinous materials and the surfaces of the glass strands or fibers it is necessary to develop the chemical forces on the glass fibers.

It is known that glass fibers which are finished with certain types of chemicals may be used to produce reinforced plastic laminates of substantially greater strength than laminates produced with unfinished glass fibers. While the strength of the laminates, under normal or so called dry conditions is increased by the finish, improvement is also observed in the increased wet strength of these laminates. All successful finishes for this purpose are of the type known as coupling agents or chemical compounds which have molecules containing certain functional groups which are capable of forming a chemical bond with the glass surface and also containing functional groups which are capable of forming a chemical bond with the resin.

An explanation for the action of chemical finishes in protecting the reinforced plastics against deterioration in strength from water permeation is believed to be for the reasons that hydroxyl groups are present on glass surfaces as silanol groups, $Si_s$—OH, in which the subscript $s$ denotes a surface atom and that the silanol groups are known to adsorb water molecules. This water adsorption is probably through hydrogen bond formation and water molecules thus adsorbed will in turn adsorb more water molecules, through hydrogen bond formation. Consequently, the surface silanol groups act as centers, or active sites, for the formation of layers of adsorbed water which under conditions of high humidity, for example, can build up to a thickness of layers to a degree where they have the properties of bulk water which may rapidly react with the glass surface, or may cause a debonding of the resin from the glass surface. By treating the glass surfaces with chemical compounds which are capable of reacting the silanol groups on the glass surfaces to form hydrolysis-resistant chemical bonds, the adsorption of water molecules by the silanol group sites can be prevented.

An object of this invention is to react diethyl phosphite with the surfaces of glass fibers to provide improved bonding strength to glass reinforced plastics.

Another object of this invention is to preliminarily treat glass cloth plies with an aqueous solution of gamma-aminopropyl triethoxysilane and then treating the plies with an aqueous solution of diethyl phosphite to provide improved bonding strength to glass reinforced laminates.

Other objects, advantages and novel features of the invention will become apparent from the following general description and examples of the invention.

According to the present invention, we have discovered that diethyl phosphite will react with the surfaces of glass fibers to provide a surface finish which acts as a coupling agent even though this compound does not contain an amino functional group or an organic radical attached to the phosphorus.

This compound has the following formula:

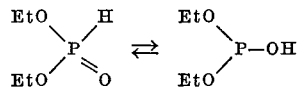

where Et is $Ch_2CH_3$. It is a derivative of trivalent phosphorus and is capable of replacing the hydrogen with another group attached directly to the phosphorus and consequently it may be reacting directly with the resin. However, there may be an entirely different mechanism to its action. In any event, flexure tests on laminates prepared from glass fibers treated with the compound, diethyl phosphite, have been made and the treated laminates were shown to possess very high strength characteristics.

It has been found advantageous in the production of the glass laminates to first treat the glass cloth plies, of which the laminate is formed, with an aqueous solution of gamma-aminopropyl triethoxysilane compound. This compound is a well known and commercially available coupling agent and is used for improving the wet strength of glass epoxy laminates. However, when the wet strength characteristics of the laminates are not too important, the glass cloth plies may be treated directly with an aqueous solution of diethyl phosphite since this compound greatly improves the dry strength characteristics of the laminates and provides a relatively simple procedure.

The diethyl phosphite can be applied to the glass fiber cloth plies by the use of various solvents to place it in solution and by a variety of procedures. Laminates have been prepared by immersing the glass cloth plies in a 1% aqueous solution of the diethyl phosphite for a short period of time as upwardly of two minutes which are then removed from the solution and allowed to air dry overnight. After drying, the plies are then heated in an oven at between 100° and 150° C. for a period between 5 and 10 minutes in order to set the solution on the surface of the glass fibers.

In forming an epoxy glass laminate, a suitable number of plies of glass cloth, for example 12, are treated according to the general method explained above. The epoxy resin is prepared by mixing 400 grams of a good commercial resin with 360 grams of catalyst, such as methyl nadic anhydride and 4 grams of an accelerator, such as benzyldimethylamine. The epoxy resin mixture is applied to the surfaces of the treated glass cloth plies and the layers formed into a laminated composite and the composite placed in a mold. The mold is preliminarily heated to 125° F. and any air bubbles are removed after which the composite is cured at between 200° F. and 250° F. for about 2 hours and the laminate finally baked at 350° F. for about 2 hours.

In order to develop the wet strength characteristics of the laminates the glass cloth plies are preliminarily treated by immersing them in a 1% aqueous solution of gamma-aminopropyl triethoxysilane for a short period, allowed to dry, and then oven heated all under similar conditions for treating the plies with the diethyl phosphite as pointed out above. The strength characteristics may be further enhanced by rinsing the preliminary treated plies in distilled water for a period upwardly of four hours.

Obviously many modifications and variations of the present invention are possible in the light of the above teachings. It is therefore to be understood that, within the scope of the appended claims, the invention may be practiced otherwise than as specifically described.

We claim:
1. The method of treating glass fibre to improve bond strength of the glass fiber to resin which comprises:
   (a) contacting for at least two minutes the glass fiber with a 1% aqueous solution of diethyl phosphite and air drying the glass fiber, and then
   (b) elevating the temperature of the glass fiber to between 100° C. and 150° C. for a time period of between 5 and 10 minutes to set the solution residue on the surface of the glass fiber.
2. The method of providing glass fiber laminates with high flexural strength which comprises:
   (a) immersing for at least two minutes glass fiber laminate plies in 1% aqueous solution of diethyl phosphite, removing the glass fiber laminate plies from the solution, and allowing the solution to dry thereon, and then
   (b) subjecting the plies to heat treatment at a temperature between 100° C. and 150° C. for a period of between 5 minutes and 10 minutes to set the solution residue on the surface of the glass.
3. The method of providing glass fiber laminates with high flexural strength which comprises:
   (a) immersing glass fiber laminate plies in a 1 percent aqueous solution of diethyl phosphite for a period upwardly of two minutes and allowing the solution to dry thereon and then,
   (b) subjecting the treated plies to a heat treatment at a temperature between 100° C. and 150° C. for a period of between 5 and 10 minutes to set the solution on the surface of the glass fibers.
4. The method of treating glass fiber to improve wet bond strength of the glass fiber to resin which comprises:
   (a) contacting for at least two minutes the glass fiber with a 1% aqueous solution of gamma-aminopropyl triethoxysilane compound and allowing the solution to dry thereon, then
   (b) immersing the fiber in a 1% aqueous solution of diethyl phosphite for at least two minutes, air drying the fiber, and then
   (c) subjecting the fiber to a heat treatment at a temperature between 100° C. and 150° C. for a period between 5 and 10 minutes to set the residues of the solution on the surface of the glass fiber.
5. The method of providing glass fiber laminates with high flexural strength which comprises:
   (a) immersing for at least two minutes glass fiber laminate plies with a 1% aqueous solution of gamma-aminopropyl triethoxysilane compound and allowing the solution to dry thereon, then
   (b) immersing the plies in a 1% aqueous solution of diethyl phosphite compound for a period upwardly of 2 minutes, and allowing the plies to dry, and then
   (c) subjecting the plies to heat treatment at a temperature between 100° C. and 150° C. for a period of between 5 and 10 minutes to set the residues of the solutions on the surface of the glass.

References Cited

UNITED STATES PATENTS

| | | | |
|---|---|---|---|
| 2,742,378 | 4/1956 | Grotenhuis | 117—126 XR |
| 2,776,910 | 1/1957 | Erickson et al. | 117—126 XR |
| 3,002,857 | 10/1961 | Stalego | 106—74 XR |
| 3,337,391 | 8/1967 | Clayton et al. | 117—124 XR |

ALFRED L. LEAVITT, *Primary Examiner.*

W. F. CYRON, *Assistant Examiner.*